(12) United States Patent
Hughes et al.

(10) Patent No.: US 6,478,988 B1
(45) Date of Patent: Nov. 12, 2002

(54) PHOTOCHROMIC SUBSTITUTED NAPHTHOPYRAN COMPOUNDS

(75) Inventors: Frank J. Hughes, Edina; J. Thomas Ippoliti, St. Paul, both of MN (US)

(73) Assignee: BMC Vision-Ease Lens, Inc., Minneapolis, MN (US)

( * ) Notice: Subject to any disclaimer, the term of this patent is extended or adjusted under 35 U.S.C. 154(b) by 0 days.

(21) Appl. No.: 09/224,004

(22) Filed: Dec. 31, 1998

(51) Int. Cl.[7] .................................................. G02B 5/23
(52) U.S. Cl. ........................ 252/586; 351/159; 252/582; 428/412; 428/423.1; 428/423.7; 428/480; 428/500; 428/532; 524/82; 524/90; 524/110; 549/389
(58) Field of Search ............................ 524/90, 110, 82; 252/586, 582; 351/159; 428/412, 423.1, 423.7, 480, 500, 532; 549/389

(56) References Cited

U.S. PATENT DOCUMENTS

| | | | |
|---|---|---|---|
| 5,066,818 A | | 11/1991 | Germert et al. |
| 5,274,132 A | * | 12/1993 | Vangemert .................. 549/389 |
| 5,623,005 A | * | 4/1997 | Rickwood et al. ............. 524/96 |
| 5,624,757 A | * | 4/1997 | Smith .......................... 428/412 |
| 5,708,064 A | * | 1/1998 | Coleman et al. ............... 524/90 |
| 5,869,658 A | * | 2/1999 | Lin et al. ..................... 544/106 |

FOREIGN PATENT DOCUMENTS

| | | |
|---|---|---|
| WO | 9627496 | 12/1996 |
| WO | 9804937 | 5/1998 |
| WO | 9845281 | 10/1998 |
| WO | 9855539 | 10/1998 |

* cited by examiner

Primary Examiner—Judy M. Reddick
(74) Attorney, Agent, or Firm—Mark A. Litman & Assoc. P.A.

(57) ABSTRACT

The present invention relates to naphthopyrans, particularly 3,3-[substituted]-naphtho[2,1-b]pyrans and 2,2-[substituted]-naphtho[1,2-b]pyrans and particularly to novel substitution on the 3-position and 2-position, respectively, of these naphthopyrans. It has been found that there are classes and types of substitution on the 3-position and 2-position (especially combinations of 3,3-substitution and 2,2-substitution) which are novel. Some of these substitutions provide particularly desirable properties. In particular, the present invention relates to naphthopyrans wherein one 3-substituent or one 2-substituent comprises a phenyl group (including phenyl, substituted phenyl, biphenyl or substituted biphenyl) and the other 3-position or other 2-position substituent comprises a substituted or unsubstituted group selected from the group consisting of anthranilyl, azepinyl, benzoxazolyl, diazepinyl, dioazlyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrroyl, isoquinolyl, isothiazolyl, morpholino, morpholinyl, oxadiazolyl, oxathiazolyl, oxathiazyl, oxathiolyl, oxatriazolyl, oxazolyl, piperazinyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinuclidinyl, quinolyl, thiazolyl, triazolyl, and triazyl.

14 Claims, 1 Drawing Sheet

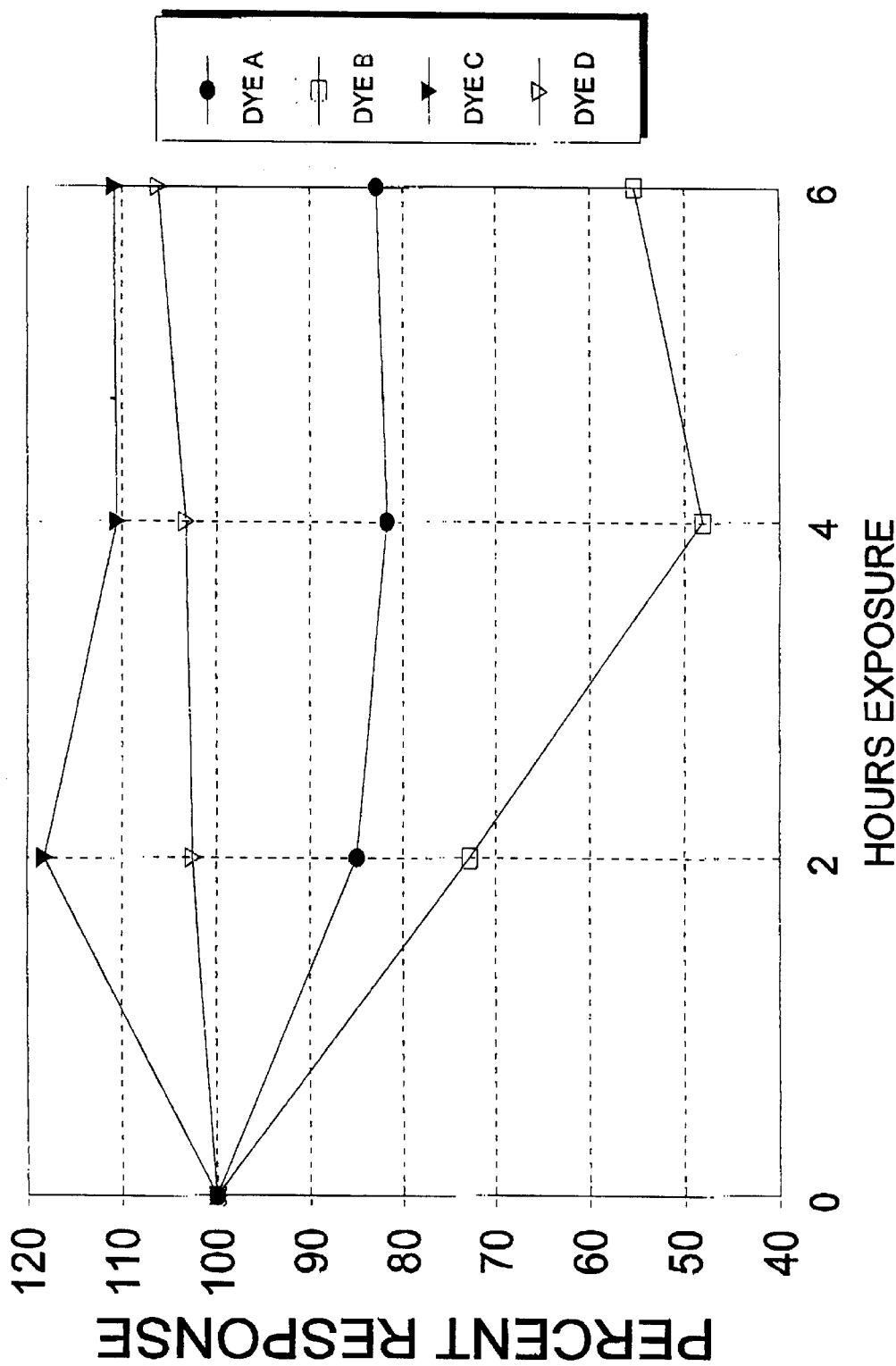

PHOTOCHROMIC SUBSTITUTED NAPHTHOPYRAN COMPOUNDS

BACKGROUND OF THE INVENTION

1. Field of the Invention

The present invention relates to photochromic compounds, particularly to photochromic substituted naphthopyran compounds, and more particularly to photochromic substituted naphthopyran compounds which display reduced film fatigue after exposure to visible light because of the selection of substituents on the naphthopyran.

2. Background of the Art

In recent years, photochromic plastic materials, particularly plastic materials for optical applications, have been the subject of considerable attention. In particular, photochromic ophthalmic plastic lenses have been investigated because of the weight advantage they offer, vis-a-vis, glass lenses. Moreover, photochromic transparencies for vehicles, such as cars and airplanes, have been of interest because of the potential safety features that such transparencies offer. When exposed to electromagnetic radiation containing ultraviolet rays, such as the ultraviolet radiation in sunlight or the light of a mercury lamp, many photochromic compounds exhibit a reversible change in color. When the ultraviolet radiation is discontinued, such a photochromic compound will return to its original color or colorless state.

Various classes of photochromic compounds have been synthesized and suggested for use in applications in which a sunlight-induced reversible color change or darkening is desired. U.S. Pat. No. 3,567,605 (Becker) describes a series of pyran derivatives, including certain benzopyrans and naphthopyrans. These compounds are described as derivatives of chromene and are reported to undergo a color change, e.g., from colorless to yellow-orange, on irradiation by ultraviolet light at temperatures below about −30° C. irradiation of the compounds with visible light or upon raising the temperature to above about 0° C. is reported to reverse the coloration to a colorless state.

U.S. Pat. No. 5,066,818 describes various 3,3-diaryl-3H-naphtho[2,1-b]pyrans as having desirable photochromic properties, i.e., high colorability and acceptable fade, for ophthalmic and other applications. Also disclosed by way of comparative example in the '818 patent are the isomeric 2,2-diaryl-2H-naphtho[1,2-b]pyrans, which are reported to require unacceptably long periods of time to fade after activation.

U.S. Pat. No. 3,627,690 describes photochromic 2,2-di-substituted-2H-naphtho[1,2-b]pyran compositions containing minor amounts of either a base or weak-to-moderate strength acid. The addition of either an acid or base to the naphthopyran composition is reported to increase the fade rate of the colored naphthopyrans, thereby making them useful in eye protection applications such as sunglasses. It is reported therein further that the fade rate of 2H-naphtho[1,2-b]pyrans without the aforementioned additives ranges from several hours to many days to reach complete reversion.

U.S. Pat. No. 4,818,096 discloses purple/blue coloring photochromic benzo- or naphthopyrans having at the position alpha to the oxygen of the pyran ring a phenyl group having a nitrogen containing substituent in the ortho or para positions. WO 96/14596 describes novel photochromic indeno-fused naphthopyran compounds, the 2,1-positions of the indeno group being fused to the f side of the naphthopyran.

U.S. Pat. No. 5,723,072 describes certain photochromic heterocyclic fused indenonaphthopyrans as novel photochromic heterocyclic fused indenonaphthopyran compounds. These compounds may be incorporated with polymeric organic host materials that contain or that are coated with such compounds and applied as photochromic coatings. As with most inventions within this field, the substituents allowed at the various positions ortho to the pyran oxygen are specifically defined and limited. The novel indenonaphtho[1,2-b]pyran compounds having a substituted or unsubstituted heterocyclic ring, the 2,3 or 3,2 positions of which are fused to the g, h, I, n, o or p side of the indenonaphthopyran, and certain substituents at the 3-position of the pyran ring. These compounds were asserted to demonstrate a bathochromic shift for the wavelength in the visible spectrum at which the maximum absorption of the activated (colored) form of the photochromic compound, i.e., the lambda max (Vis), occurs, thereby resulting in activated colors ranging from orange to blue/gray.

SUMMARY OF THE INVENTION

The present invention relates to naphthopyrans and particularly to novel substitution on the 3 position of naphthopyrans. It has been found that there are classes and types of substitution on the 3-position of a 2,1-b-naphthopyran (especially combinations of 3,3-substitution) which are novel or on the 2-position of the 1,2-b-naphthopyran (especially combinations of 2,2'-substituents). Some of these substitutions provide particularly desirable properties. In particular, the present invention relates to naphthopyrans wherein one 3-substituent (or 2-substituent for the 1,2-b-naphthopyran) comprises a phenyl group (including phenyl, substituted phenyl, biphenyl or substituted biphenyl) and the other 3-position (or 2-position for the 1,2-b-naphthopyran) substituent comprises a substituted phenyl group wherein the substituent is selected from the group consisting of anthranilyl, azepinyl, benzoxazolyl, diazepinyl, dioazlyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrroyl, isoquinolyl, isothiazolyl, morpholino, morpholinyl, oxadiazolyl, oxathiazolyl, oxathiazyl, oxathiolyl, oxatriazolyl, oxazolyl, piperazinyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinuclidinyl, quinolyl, thiazolyl, triazolyl, and triazyl. Substitution at other positions on the naphthopyrans molecule may be liberally made according to the background knowledge of those with ordinary skill in the art. These substituted naphthopyrans are particularly useful as photochromic compounds within polymeric coatings and coating compositions used in the optical or ophthalmic art.

BRIEF DESCRIPTION OF THE DRAWINGS

FIG. 1 shows a graph of Film Fatigue for coating compositions containing photochromic dyes, Film Fatigue being measured under accelerated testing to 30 Watts/sm at 400–700 nm Xenon Lamp exposure) as a percentage of original response ability.

DETAILED DESCRIPTION OF THE INVENTION

The present invention relates to naphthopyrans and particularly to novel substitution on the 3 position of naphthopyrans. It has been found that there are classes and types of substitution on the 3-position (especially combinations of 3,3-substitution which are novel. Some of these substitutions provide particularly desirable properties. In particular, the present invention relates to naphthopyrans wherein one 3-substituent comprises a phenyl group (including phenyl, substituted phenyl, biphenyl or substituted biphenyl) and the other 3-position substituent comprises a substituted phenyl group having a substituent selected from the group consisting of anthranilyl, azepinyl, benzoxazolyl, diazepinyl, dioazlyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrroyl, isoquinolyl, isothiazolyl, morpholino, morpholinyl, oxadiazolyl, oxathiazolyl, oxathiazyl, oxathiolyl, oxatriazolyl, oxazolyl, piperazinyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinuclidinyl, quinolyl, thiazolyl, triazolyl, and triazyl. These ring structures are well understood in the art as for example in the *CRC Handbook of Chemistry and Physics*, 60$^{th}$ *Edition*, pp. C-56, C-57 and C-35 through C-38. Substitution at other positions on the naphthopyrans molecule may be liberally made according to the background knowledge of those with ordinary skill in the art. These substituted naphthopyrans are particularly useful as photochromic compounds within polymeric coatings and coating compositions used in the optical or ophthalmic art.

In accordance with the present invention, it has now been discovered that certain novel naphthopyrans, including 3H-naphtho[1,2-b]pyrans, including such diverse pyrans as indeno[2,1-f]naphtho[1,2-b]pyrans having activated colors ranging from orange to blue/gray, and especially compounds in the grey to purple may be prepared. These compounds may be described as naphthopyrans having two substituents at the 2-position of the pyran ring selected from one 2-substituent comprises a phenyl group (including phenyl substituted phenyl, biphenyl or substituted biphenyl) and the other 2-position substituent comprises a substituted phenyl group having a substituent selected from the group consisting of anthranilyl, azepinyl, benzoxazolyl, diazepinyl, dioazlyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrroyl, isoquinolyl, isothiazolyl, morpholino, morpholinyl, oxadiazolyl, oxathiazolyl, oxathiazyl, oxathiolyl, oxatriazolyl, oxazolyl, piperazinyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinuclidinyl, quinolyl, thiazolyl, triazolyl, and triazyl groups.

The terminology "group(s)" has a standard meaning within the practice of the present invention. The term 'group' includes both substituted and unsubstituted compounds, moieties or radicals. For example, a phenyl group includes any moiety which contains the central ring structure of a phenyl ring, while "phenyl' (without modification by the word 'group" or "phenyl moiety" refers to only $C_6H_5$ as the substituent. For example, phenyl group would include p-hydroxyphenyl, m-methoxyphenyl, o-chlorophenyl, 2,4- and 3,5-difluorophenyl, 2,4-diethoxyphenyl, naphthyl, 3,5-dicyanophenyl, bisphenyl, and the like. Substituents which are particularly useful on phenyl groups include alkyl groups (e.g., of 1–20 carbons atoms), alkoxy (e.g., of 1–20 carbon atoms), halogen (e.g., chloro, fluoro, bromo and iodo), hydroxy, phenoxy, cyano, acetyl, acetoxy, nitro, sulfo, sulfonate, carbonate, carboxylate, amino, ureido-linked groups, and the like. Carbon chains tend to be preferred as lower alkyl chains of from 1–4 carbon atoms, but ether, ester and thioether linkages are also tolerable. Similarly a "nucleus of the formula" represents all chemical compounds having that nucleus with any substitution that does not alter the bonds of the nucleus.

Formula Ia, Ib, and Ic represent nuclei of the formula:

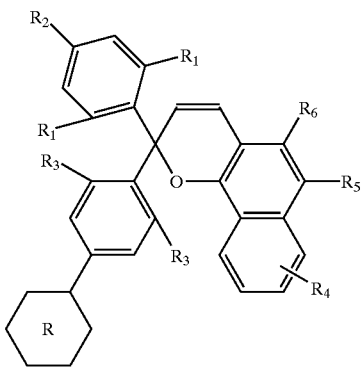

Ia

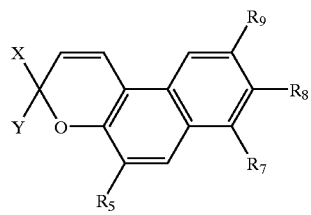

Ib

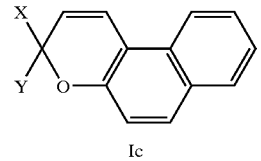

Ic where R1, R3, R4 and R5 are hydrogen or various radicals, groups or substituents used on photochromic dyes and R2 is either piperidino, morpholino or piperazino, hydrogen or other known substituents. Also ring R is piperidino, morpholino or piperazino. R6 is again any substituent useful within the art as described herein and wherein the substituents X and Y on the 3-position are as defined above.

Formula II

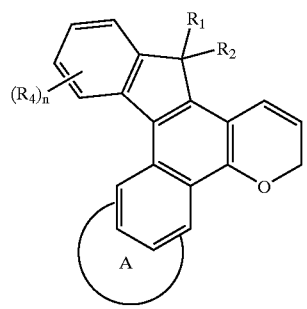

-continued

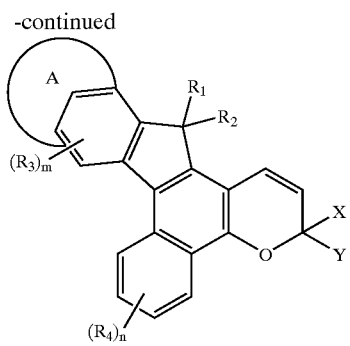

In formula II, A also may include an unsubstituted, monosubstituted or di-substituted heterocyclic ring selected from the group consisting of benzothieno, benzofurano and indolo, the 2,3 or 3,2 positions of the heterocyclic ring being fused to the g, h, I, n, o or p side of an indenonaphthopyran. Each of the described heterocyclic ring substituents may be C1–C6 alkyl, C5–C7cycloalkyl, C1–C6 alkoxy, bromo, chloro or fluoro. Preferably, the heterocyclic ring A is unsubstituted or mono-substituted, and the heterocyclic ring substituents are C1–C4 alkyl or C1–C4 alkoxy. Most preferably, the heterocyclic ring A is unsubstituted or monosubstituted, the 2,3 or 3,2 position of the heterocyclic ring is fused to the g or p side of the indenonaphthopyran, and the heterocyclic ring substituents are C1–C3 alkyl or C1–C3 alkoxy.

In graphic formulae I and II, R1, R2, X and Y, for example, may be selected from amongst the above listed substituents as hydrogen (e.g., unsubstituted), hydroxy, bromo, fluoro or chloro, alkyl groups, substituted alkyl (e.g., even including perfluoroalkyl), alkoxy groups, phenyl group, and R2 may be the group, —CH(V)2, wherein V is —CN or —COOR5, and each R5 is hydrogen, C1–C6 alkyl, phenyl(C1–C3)alkyl, mono(C1–C6)alkyl substituted phenyl (C1–C3)alkyl, mono(C1–C6)alkoxy substituted phenyl (C1–C3)alkyl, or the unsubstituted, mono- or di-substituted aryl groups phenyl or naphthyl, or R2 may be the group, —CH(R6)Y, wherein R6 is hydrogen, C1–C6 alkyl or the unsubstituted, mono- or di-substituted aryl groups phenyl or naphthyl, and Y is —COOR5, —COR[7, ]or —CH2OR11, wherein R7 is hydrogen, C1–C6 alkyl, the unsubstituted, mono- or di-substituted aryl groups phenyl or naphthyl, amino, mono(C1–C6)alkylamino, di(C1–C6)alkylamino, e.g. dimethyl amino, methyl propyl amino, etc., phenylamino, mono- or di-(C1–C6)alkyl substituted phenylamino, mono- or di-(C1–C6)alkoxy substituted phenylamino, diphenylamino, mono- or di(C1–C6)alkyl substituted diphenylamino, i.e., each phenyl has one or two C1–C6 alkyl substituents, mono- or di-(C1–C6)alkoxy substituted diphenylamino, morpholino, or piperidino; R11is hydrogen, —COR5, C1–C6 alkyl, C1–C3alkoxy(C1–C6) alkyl, phenyl(C1–C3)alkyl, mono(C1–C6)alkyl substituted phenyl(C1–C3)alkyl, mono(C1–C6)alkoxy substituted phenyl(C1–C3)alkyl, or the unsubstituted, mono- or di-substituted aryl groups phenyl or naphthyl, each of all of the described aryl group substituents including C1–C6 alkyl or C1–C6 alkoxy. Alternatively, R1 and R2 together may form the group, =C(V)2 or =C(R6)W, wherein W is —COOR5 or —COR7.

One substituent (Y) on the 3-position (or 2-substituent for the 1,2-b-naphthopyran) must be an aromatic group, preferably a phenyl or naphthyl group, and the other 3-position (or 2-substituent for the 1,2-b-naphthopyran) substituent (Z) comprises a substituted phenyl group having a substituent selected from the group consisting of anthranilyl, azepinyl, benzoxazolyl, diazepinyl, dioazlyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrroyl, isoquinolyl, isothiazolyl, morpholino, morpholinyl, oxadiazolyl, oxathiazolyl, oxathiazyl, oxathiolyl, oxatriazolyl, oxazolyl, piperazinyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinuclidinyl, quinolyl, thiazolyl, triazolyl, and triazyl groups as well as Z-substituted phenyl (e.g., $C_6H_4$—Z, or $C_6H_4$—Z where at least one more H on the bridging phenyl ring is replaced by alkyl groups (e.g., of 1–20 carbons atoms), alkoxy (e.g., of 1–20 carbon atoms), halogen (e.g., chloro, fluoro, bromo and iodo), hydroxy, phenoxy, cyano, acetyl, acetoxy. Preferred compounds of the present invent actually include naphthopyrans in which Y is a phenyl group and the other 3-position substituent (or 2-substituent for the 1,2-b-naphthopyran) is a Z-substituted phenyl. Z may not be defined in such a way as to form an unlimited repeating unit of Z—$C_6H_4$—Z—$C_6H_4$—Z—$C_6H_4$—Z, etc. or even a dimerized version Z—$C_6H_4$—Z—$C_6H_4$—. That is, there may be only a single linear arrangement of a —$C_6H_4$—Z group present as a substituent at the 3-position. That may again be referenced as the definition of Z as a unit of $C_6H_4$—Z does not include $C_6H_4$—Z as part of that definition. These discussions of substituents are solely illustrative and not limiting. The range of substituents available to one of ordinary skill in the art is understood to be quite broad.

Examples of these types of compounds are shown in Examples 1 and 2 of this invention. It is to be noted that the substitution of at least one of the phenyl groups bonded to the 3-position of the naphthopyrans of the present invention is shown herein to provide unexpected and improved results as compared to similar compounds, but for substitution on the phenyl rings. That is, 3,3-diphenyl- 3H-naphtho[2,1-b] pyran and 3,3-diphenyl-8-methoxy-3H-naphtho[2,1-b]pyran display significantly reduced properties (e.g., at least higher rates of film fatigue) as compared to 3(2,4-difluorophenyl), 3(4-piperidinophenyl)-3H-naphtho[2,1-b]pyran and 3(4-piperidinophenyl)-8-methoxy-3H-naphtho[2,1-b]pyran.

Compounds of the invention, as described hereinbefore, may be prepared by the following described Reactions: a) Friedel-Crafts methods using an appropriately substituted or unsubstituted benzoyl chloride with a commercially available substituted or unsubstituted heterocyclic compound. See the publication Friedel-Crafts and Related Reactions, George A. Olah, Interscience Publishers, 1964, Vol. 3, Chapter XXXI (Aromatic Ketone Synthesis), and "Regioselective Friedel-Crafts Acylation of 1,2,3,4-Tetrahydroquinoline and Related Nitrogen Heterocycles: Effect on NH Protective Groups and Ring Size" by Ishihara, Yugi et al, J. Chem. Soc., Perkin Trans. 1, pages 3401 to 3406, 1992;

b) a reaction of a substituted or unsubstituted ketone represented with sodium acetylide in a suitable solvent, such as anhydrous tetrahydrofuran (THF), to form the corresponding propargyl alcohol. Propargyl alcohols having B or B' groups other than substituted and unsubstituted phenyl may be prepared from commercially available ketones or ketones prepared via reaction of an acyl halide with a substituted or unsubstituted benzene, naphthalene or heteroaromatic compound. Propargyl alcohols may be prepared by the methods described in U.S. Pat. No. 5,274,132, column 2, lines 40 to 68;

c) a substituted or unsubstituted ketone is reacted with an ester of succinic acid such as dimethyl succinate. Addition of the reactants to a solvent, e.g., toluene, containing potassium t-butoxide or sodium hydride as the base yields the Stobbe condensation half ester. The half ester undergoes cyclodehydration in the presence of acetic anhydride to form the heterofused acetoxynaphthalenes. Product compounds may be separated by crystallization, hydrolyzed in an aqueous alcoholic solution of a base, such as sodium hydroxide, followed by treatment with aqueous hydrochloric acid (H<+>) to form the carboxynaphthols;

d) carboxynaphthols are cyclized by heating, e.g., from about 1600 to about 220° C., in the presence of an acid, such as phosphoric acid, to form a hydroxy-substituted benz-fused fluorenone . See the article by F. G. Baddar et al, in the J. Chem. Soc., page 986, 1958. An alternate method of synthesizing reactants is described by C. F. Koelsch in the Journal of Organic Chemistry, volume 26, page 2590, 1961; e) coupling of the compounds with propargyl alcohol represented by graphic formula VI in the presence of a catalytic amount of an acid, e.g., dodecylbenzene sulfonic acid (DBSA), results in an indeno-fused naphthopyran; f) further methods for preparing compounds having a variety of R1 and R2 substituents are described. Starting with an alpha -bromoester in the presence of activated zinc dust is a route resulting in other compounds. This reaction, referred to as the Reformatsky Reaction, is reviewed by R. L. Shriner in Organic Reactions Vol. 1, pp 1–37, 1942. Certain additional compounds can be further reacted with chlorinating reagents, for example thionyl chloride, to produce derivatives. Compounds be dehydrohalogenated by heating in the presence of a tertiary amine, for example collidine, to yield alpha, beta -unsaturated esters.

Alternatively appropriate compounds can be condensed with a compound containing an active methylene in the presence of an amine to produce other related compounds. This reaction, referred to as the Knoevenagel Condensation, is reviewed by G. Jones in Organic Reactions Vol. 15, pp 204–599, 1967. U.S. Pat. No. 5,723,072 also describes synthetic procedures for the manufacture of naphthopyrans which are incorporated herein by reference for those procedures.

Compounds of the invention may be used in those commercial and industrial applications in which organic photochromic substances may be employed, such as optical lenses, e.g., vision correcting ophthalmic lenses and planar lenses, face shields, goggles, visors, camera lenses, windows, Fresnel lenses, liquid crystal or LED or plasma display panels, automotive windshields, aircraft and automotive transparencies, e.g., sun-roofs, sidelights and backlights, plastic films and sheets, textiles and coatings, e.g., coating compositions such as paints, and verification marks on security documents, e.g., documents such as banknotes, passports and drivers' licenses for which authentication or verification of authenticity may be desired.

Examples of contemplated indenonaphthopyran compounds within the scope of the invention include the following:
(a) 3-(difluorophenyl)-3-(4-piperidinophenyl)-8-methoxy-naphtho[1,2-b]pyran;
(b) 3-phenyl-3-(4-piperidinophenyl)-8-methoxy-naphtho[1,2-b]pyran;
c) 3-phenyl-3-(4-anthranilyl, azepinyl, benzoxazolyl, diazepinyl, dioazlyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrroyl, isoquinolyl, isothiazolyl, morpholino, morpholinyl, oxadiazolyl, oxathiazolyl, oxathiazyl, oxathiolyl, oxatriazolyl, oxazolyl, piperazinyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinuclidinyl, quinolyl, thiazolyl, triazolyl, or triazyl group)-8-methoxy-naphtho[1,2-b]pyran; and (d) 3-di(anthranilyl, azepinyl, benzoxazolyl, diazepinyl, dioazlyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrroyl, isoquinolyl, isothiazolyl, morpholino, morpholinyl, oxadiazolyl, oxathiazolyl, oxathiazyl, oxathiolyl, oxatriazolyl, oxazolyl, piperazinyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinuclidinyl, quinolyl, thiazolyl, triazolyl, or triazyl group)-8-methoxy-naphtho[1,2-b]pyran. The 8-position has a definite effect of enhancing the bathochromicity of the molecule, and it is usually desirable to have that position substituted with such groups as alkyl, alkoxy (most preferred), phenoxy, phenyl, and the like.

It is contemplated that the organic photochromic naphthopyrans of the present invention may be used alone, in combination with other naphthopyrans, including indenonaphthopyrans of the present invention or the prior art, or in combination with one or more other appropriate complementary organic photochromic materials, e.g., organic photochromic compounds having at least one activated absorption maxima within the range of between about 400 and 700 nanometers, or substances containing same, and may be incorporated, e.g., dissolved or dispersed, in a polymeric organic host material used to prepare photochromic articles and which color when activated to an appropriate hue. Other than where otherwise indicated, all numbers expressing wavelengths, quantities of ingredients or reaction conditions used herein are to be understood as modified in all instances by the term "about". Examples of complementary organic photochromic compounds include other indenonaphthopyrans, chromenes and oxazines, e.g., naphthopyrans having the 2,1 positions of an indeno group fused to the f side of the naphtho portion, and certain substituents at the 3-position (or 2-substituent for the 1,2-b-naphthopyran) of the pyran ring, substituted 2H-phenanthro [4,3-b]pyran and 3H-phenanthro[1,2-b]pyran compounds, benzopyran compounds having substituents at the 2-position of the pyran ring including a dibenzo-fused 5 member heterocyclic compound and a substituted or unsubstituted heterocyclic ring, such as a benzothieno or benzofurano ring fused to the benzene portion of the benzopyrans, spiro (benzindoline)naphthopyrans, spiro indoline)benzopyrans, spiro(indoline)naphthopyrans, spiro indoline)quinopyrans, spiro(indoline)pyrans, spiro indoline)napthoxazines, spiro indoline)pyridobenzoxazines, Spiro benzindoline) pyridobenzoxazines, Spiro benzindoline)naphthoxazines, spiro(indoline)benzoxazines, and mixtures of such photochromic compounds. Many of such photochromic compounds are described in the open literature, e.g., U.S. Pat. Nos. 3,562,172; 3,567,605; 3,578,602; 4,215,010; 4,342, 668; 4,816,584; 4,818,096; 4,826,977; 4,880,667; 4,931, 219; 5,066,818; 5,238,931; 5,274,132; 5,384,077; 5,405,958; 5,429,774; 5,466,398; 5,514,817; 5,552,090; 5,552,091; 5,565,146; 5,573,712; 5,578,252; and 5,723,072; WO 96 14596 and Japanese Patent Publication 62/195383. Spiro (indoline)pyrans are also described in the text, Techniques in Chemistry, Volume III, "Photochromism", Chapter 3, Glenn H. Brown, Editor, John Wiley and Sons, Inc., New York, 1971.

Other photochromic substances contemplated are photochromic metal-dithizonates, e.g. mercury dithizonates which are described in, for example, U.S. Pat. No. 3,361,706, fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic compounds in the above patents are incorporated herein, in their entirety, by reference. The photochromic articles of the present invention may contain one photochromic compound or a mixture of photochromic compounds, as desired.

Each of the photochromic substances described herein may be used in amounts (or in a ratio) such that an organic host material to which the photochromic compounds or mixture of compounds is applied or in which they are incorporated exhibits a desired resultant color, e.g., a substantially neutral color when activated with unfiltered sunlight, i.e., as near a neutral color as possible given the colors of the activated photochromic compounds. Neutral gray and neutral brown colors are preferred.

A neutral gray color exhibits a spectrum that has relatively equal absorption in the visible range between 400 and 700 nanometers. A neutral brown color exhibits a spectrum in which the absorption in the 400–550 nanometer range is moderately larger than in the 550–700 nanometer range. An alternative way of describing color is in terms of its chromaticity coordinates, which describe the qualities of a color in addition to its luminance factor, i.e., its chromaticity. In the CIE system, the chromaticity coordinates are obtained by taking the ratios of the tristimulus values to their sum, e.g., $x=X/(X+Y+Z)$ and $y=Y/(X+Y+Z)$. Color as described in the CIE system can be plotted on a chromaticity diagram, usually a plot of the chromaticity coordinates x and y. See pages 47–52 of *Principles of Color Technology*, by F. W. Billmeyer, Jr., and Max Saltzman, Second Edition, John Wiley and Sons, N.Y. (1981). As used herein, a near neutral color is one in which the chromaticity coordinate values of "x" and "y" for the color are within the following ranges (D65 illuminant): x=0.260 to 0.400, y=0.280 to 0.400 following activation to 40 percent luminous transmission by exposure to solar radiation (Air Mass 1 or 2).

The amount of photochromic substance or composition containing same applied to or incorporated into a host material is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity up to a certain limit.

The relative amounts of the aforesaid photochromic compounds used will vary and depend in part upon the relative intensities of the color of the activated species of such compounds, and the ultimate color desired. Generally, the amount of total photochromic substance incorporated into or applied to a photochromic optical host material may range from about 0.05 to 1.0 or higher, e.g., from 0.1 to 0.45, milligrams per square centimeter of surface to which the photochromic substance(s) is incorporated or applied.

The photochromic substances of the present invention may be applied to or incorporated into a host material such as a polymeric organic host material by various methods described in the art. Such methods include dissolving or dispersing. the photochromic substance within the host material, e.g., casting it in place by adding the photochromic substance to the monomeric host material prior to polymerization; imbibition of the photochromic substance into the host material by immersion of the host material in a hot solution of the photochromic substance or by thermal transfer; providing the photochromic substance as a separate layer between adjacent layers of the host material, e.g., as a part of a polymeric film; and applying the photochromic substance as part of a coating or film placed on the surface of the host material. The term "imbibition" or "imbibe" is intended to mean and include permeation of the photochromic substance alone into the host material, solvent assisted transfer of the photochromic substance into a porous polymer, vapor phase transfer, and other such transfer mechanisms.

Compatible (chemically [do not chemically react to adversely affect the structure of the compounds], physically [e.g., do not separate or repel each other to form phases] and color-wise [are not chromatically additive to provide colors or hues of undesirable content or affect]) tints, i.e., dyes, may be applied to the host material to achieve a more aesthetic result, for medical reasons, or for reasons of fashion. The particular dye selected will vary and depend on the aforesaid need and result to be achieved. In one format, the dye may be selected to complement the color resulting from the activated photochromic substances, e.g., to achieve a more neutral color or absorb a particular wavelength of incident light. In another format, the dye may be selected to provide a desired hue to the host matrix when the photochromic substances is in an unactivated state.

The host material will usually be transparent, but may be translucent or even opaque. The host material need only be transparent to that portion of the electromagnetic spectrum, which activates the photochromic substance, i.e., that wavelength of ultraviolet (UV) light that produces the open form of the substance and that portion of the visible spectrum that includes the absorption maximum wavelength of the substance in its UV activated form, i.e., the open form. Preferably, the host color should not be such that it masks the color of the activated form of the photochromic substance, i.e., so the change in color is readily apparent to the observer. More preferably, the host material article is a solid transparent or optically clear material, e.g., materials suitable for optical applications, such as plano and ophthalmic lenses, windows, automotive transparencies, e.g., windshields, aircraft transparencies, plastic sheeting, polymeric films, etc.

Examples of polymeric organic host materials which may be used with the photochromic substances or compositions described herein include: polymers, i.e., homopolymers and copolymers (inclusive of terpolymers and higher multiples of monomers), of polyol(allyl carbonate) monomers, diethylene glycol dimethacrylate monomers, diisopropenyl benzene monomers, ethoxylated bisphenol A dimethacrylate monomers, ethylene glycol bismethacrylate monomers, poly (ethylene glycol) bismethacrylate monomers, ethoxylated phenol methacrylate monomers and alkoxylated polyhydric alcohol acrylate monomers, such as ethoxylated trimethylol propane triacrylate monomers; polymers, i.e., homopolymers and copolymers, of polyfuictional, e.g., mono-, di- or multi-finctional, acrylate and/or methacrylate monomers, poly(C1–C12 alkyl methacrylates), such as poly(methyl methacrylate), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, thermoplastic polycarbonates, polyesters, poly(ethylene terephthalate), polystyrene, poly(alpha methylstyrene), copoly(styrene-methyl methacrylate), copoly(styreneacrylonitrile), polyvinylbutyral and polymers, i.e., homopolymers and copolymers, of diallylidene pentaerythritol, particularly copolymers with polyol(allyl carbonate) monomers, e.g., diethylene glycol bis(allyl carbonate), and acrylate monomers.

Transparent copolymers and blends of transparent polymers are also suitable as host materials. Preferably, the host material is an optically clear polymerized organic material prepared from a thermoplastic polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, such as copolymers with vinyl acetate, e.g., copolymers of from 80–90 percent diethylene glycol bis(allyl carbonate) and 10–20 percent vinyl acetate, particularly 80–85 percent of the bis(allyl carbonate) and 15–20 percent vinyl acetate, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl finctional groups, as described in U.S. Pat. No. 5,200,483; poly(vinyl acetate), polyvinylbutyral, polyurethane, polymers of members of the group consisting of diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol methacrylate monomers and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate and acrylonitrile.

More particularly described is use of the photochromic naphthopyrans of the present invention with optical organic resin monomers used to produce optically clear polymerizates, i.e., materials suitable for optical applications, such as for example plano and ophthalmic lenses, windows, and automotive transparencies. Such optically clear polymerizates may have a refractive index that may range from about 1.48 to about 1.75, e.g., from about 1.495 to about 1.66. Specifically contemplated are optical resins sold by PPG Industries, Inc. under the designation CR-307 and CR-407.

Although the present invention has been described with reference to the specific details of particular embodiments thereof, it is not intended that such details be regarded as limitations upon the scope of the invention except as and to the extent that they are included in the accompanying claims.

The following examples are intended to assist and further enable practice of the present invention without intending to limit the scope of the invention.

EXAMPLES

Example 1

5 grams of 2,4-difluorophenyl-4-piperidinophenyl ketone were placed together with 5 grams of lithium acetylide in 250 milliliters of tetrahydrofuran. This was stirred for 72 hours. The resultant mass was separated and dried with anhydrous sodium sulfate. The resultant liquid was purified by column chromatography. This resultant liquid was evaporated and the solid material obtained was identified as relatively pure 2,4-difluorophenyl-4 piperidinophenylpropargyl alcohol by NMR spectroscopy. 2 grams of this product were mixed with 1 gram of 2-naphthol in 200 milliliters of benzene. 20 milligrams of p-toluenesulfonic acid were added and the mixture was stirred under reflux for 8 hours. The result was cooled and washed with 10% aqueous sodium hydroxide. The solvent was removed and the resulting material was taken up in benzene and purified by column chromatography. The product was shown to be relatively pure 3-(2,4-difluorophenyl), 3-(4-piperidinophenyl) -3H-naphtho[2,1-b]pyran by NMR spectroscopy:

Example 2

5 grams of 4-methoxyphenyl-piperidinophenylketone were placed together with 5 grams of lithium acetylide in 250 milliliters of tetrahydrofuran. This was stirred for 72 hours. The resultant mass was poured over ice and diluted with water to form and organic layer and an aqueous layer. The organic layer was separated and dried with anhydrous sodium sulfate. The resultant liquid was purified by column chromatography, resulting in a compound determined to be 4-methoxyphenyl-4-peperidinophenylpropargyl alcohol by NMR spectroscopy. 2 Grams of this product were mixed with 1.08 grams of 6-piperidinoo-2-maphthol in 200 milliliters of benzene. 20 milligrams of p-toluenesulfonic acid were added and the mixture was stirred under reflux for 8 hours. The solvent was removed and the resulting material was taken up in benzene and purified by column chromatography. The product was shown to be relatively pure 3-(4-methoxyphenyl),3(4-piperidinophenyl)-8-piperidino-3H-naphtho[2,1-b]pyran by NMR spectroscopy:

Example 3

5 grams of phenyl-4-pyrazolyl ketone were placed together with 5 grams of lithium acetylide in 250 milliliters of tetrahydrofuram. This was stirred for 72 hours. The resultant mass was poured over ice and diluted with water to form an organic layer and an aqueous layer. The organic layer was separated and dried with anhydrous sodium sulfate. The resultant liquid was purified by column chromatography. 2 grams of this product were mixed with 1 gram of 2-naphthol in 200 milliliters of benzene. 20 milligrams of po-toluenesulfonic acid were added and the mixture was stirred under reflux for 8 hours. The result was cooled and washed with 10% aqueous sodium hydroxide. The resultant liquid was purified by column chromatography. The solvent was removed and the resulting material recrystallized from a suitable solvent. The product was shown to be relatively pure 3- phenyl-3(4-pyrazolylphenyl)-3H-naphtho[2,1b] pyran by NMR spectroscopy.

The intermediates used in the practice of the present invention to enable selection of substitution at the many alternative positions available in the practice of the invention may be provided by any of three synthetic routes. These three different synthetic routes are believed to be able to provide any of the intermediate compounds needed for the wide range of synthesis of the 3,3-[substituted]-naphtho[2,1-b]pyrans and the 2,2-[substituted]-naphtho[1,2-b]pyrans. These routes and some of the specific results of their use are shown below.

Four photochromic dyes were tested for their long term resistance to light exposure: A) 3,3-diphenyl-3-H-naphtho[2,1-b]pyran, B)3,3-diphenyl-8-methoxy-3-H-naphtho[2,1-b]pyran, C) 3(2,4-difluorophenyl), 3(4-piperidinophenyl)-3H-naphtho[2,1-b]pyran, and D) 3(2,4-difluorophenyl), 3(4-piperidinophenyl)-8-methoxy-3H-naphtho[2,1-b]pyran. Each of the dyes was dissolved in chloroform and then mixed with a polyurethane plastic. This solution was then cast on a galss plate and dried to about 0.3 mm film thickness. The film was removed rom the plate and placed onto a holder, with the film covering a hole in the holder. The holder was mounted in a spectrometer so that transmission could be measured through the film over the hole. Transmission of the film was measured over the visible region of the spectrum in an unactivated state, then activated for five minutes with a solar simulator (Heraeus Suntest Model 550071 Xenon lamp). The sum of these transmission differences is referred to as photochromic response. Typically, the film loses its photochromic performance due to exposure to UV radiation, the dye in the film does not activates a strongly, and its unactivated transmission may not be as strong. The data for the four dyes is shown in FIG. 1. After six hours exposure, the photochromic response was reduced to 85% for dye A and 56% for dye B, as compared to the original level of performance. Dyes C and D, according to the present invention, actually showed an increase in photochromic response in the same period under the same conditions.

SYNTHESIS 1

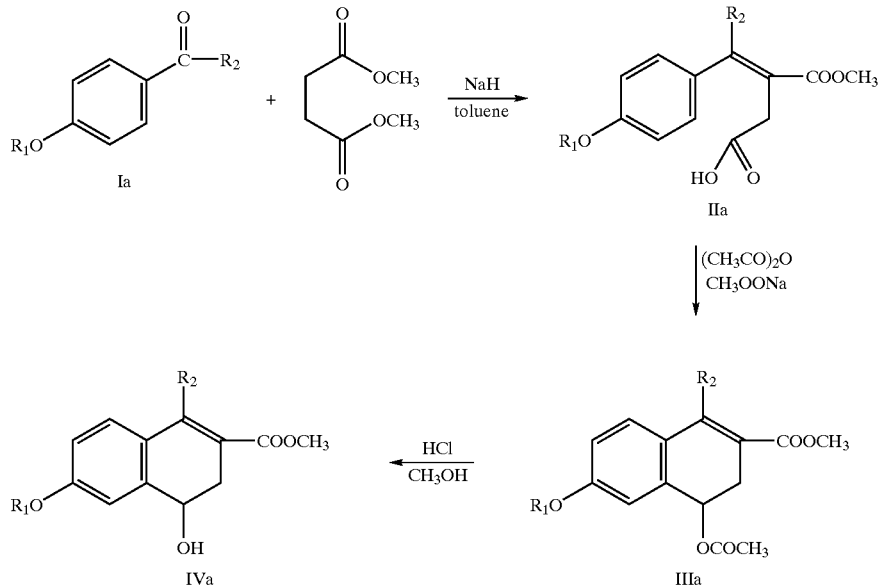

SYNTHESIS 2

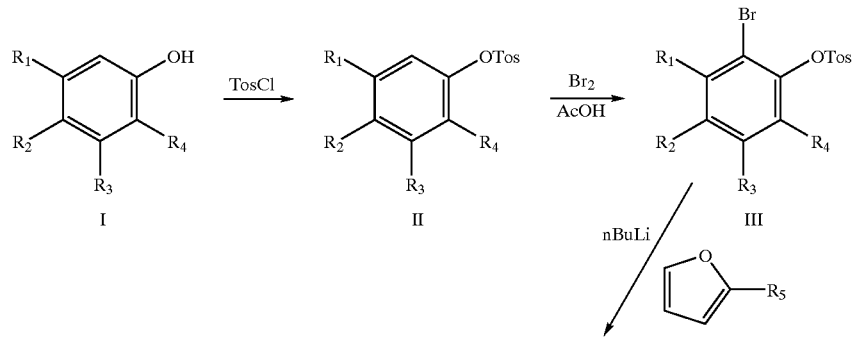

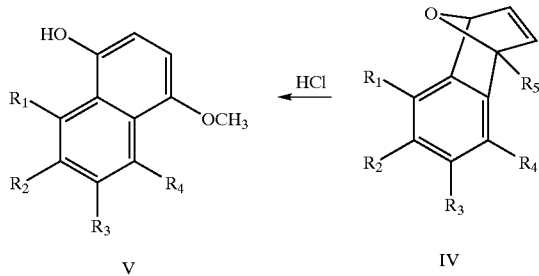
SYNTHESIS 3
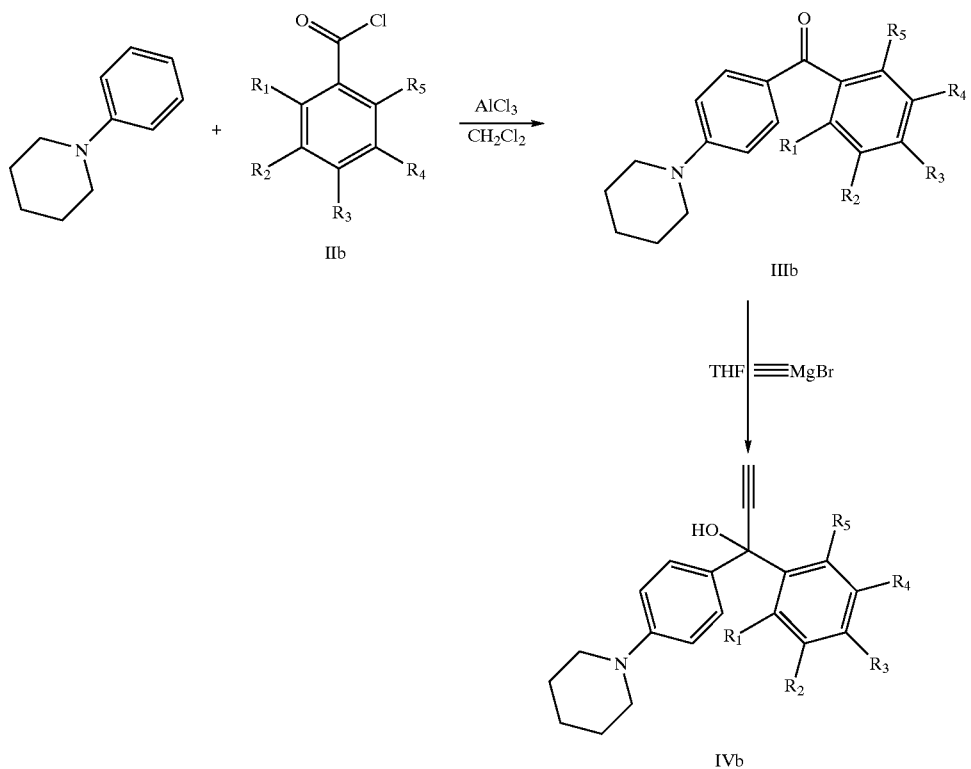
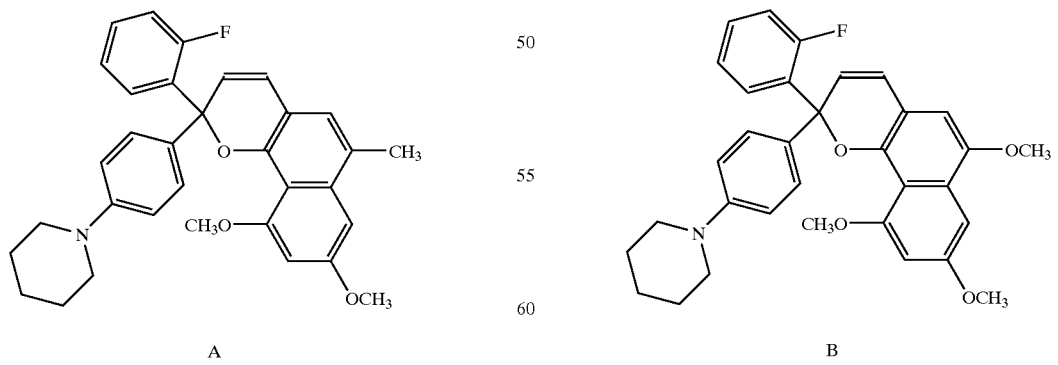

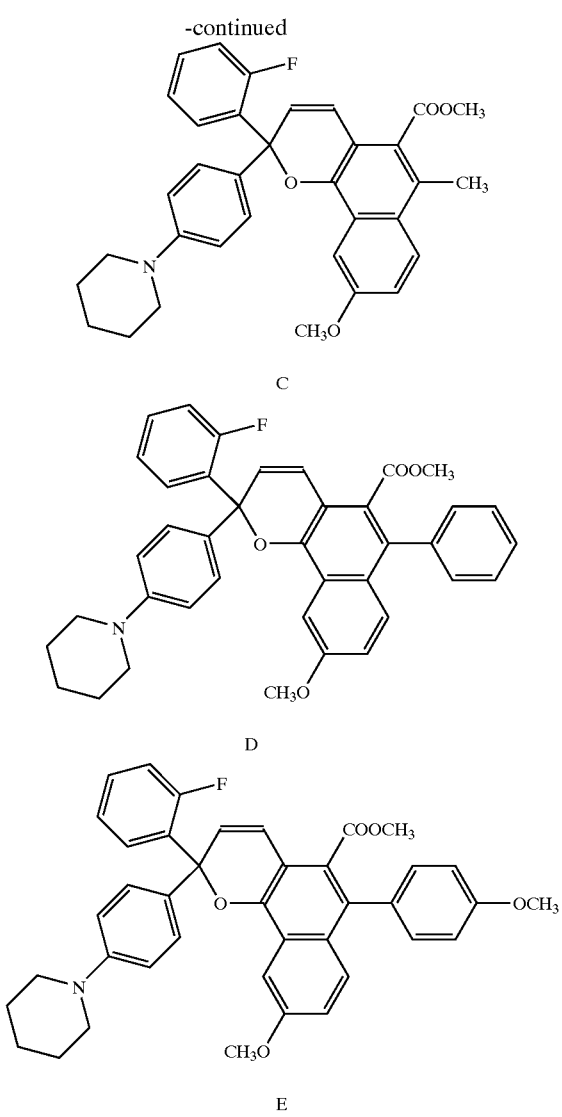

C

D

E

Use of Synthesis 3 has resulted in multigram amounts of three different propargyl alcohols shown in the following structure where R1 is F, or is OCH3, or R2 is phenyl.

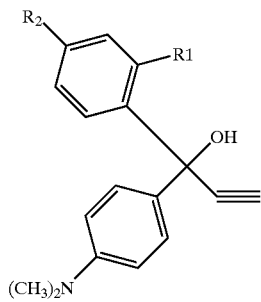

We claim:

1. A photochromic article comprising a transparent substrate having at least one coating comprising an optical organic resin and a photochromic amount of a photochromic naphthopyran comprising a 3,3-[substituted]-naphtho[2,1-b] pyran or a 2,2-[substituted]-naphtho[1,2-b] wherein:
   a) one 3-position substituent on a 3,3-[substituted]-naphtho[2,1-b]pyran comprises a phenyl group or
   b) one 2-position on a 2,2-[substituted]-naphtho[1,2-b] pyran comprises a phenyl group and
   another of the 3-positions on the 3,3-[substituted]-naphtho[2,1-b]pyran or another of the 2-positions on the 2,2-[substituted]-naphtho[1,2-b]pyran comprises a substituted phenyl group having a substituent on the substituted phenyl group selected from the group consisting of an anthranilyl, azepinyl, benzoxazolyl, diazepinyl, diazolyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrrol, isoquinolyl, isothiazolyl, morpholino, morpholinyl, oxadiazolyl, oxathiazolyl, oxathiazyl, oxathiolyl, oxatriazolyl, oxazolyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinocyclidinyl, quinolyl, thiazolyl, triazolyl and triazyl groups.

2. The photochromic article of claim 1 wherein the optical organic resin is selected from the group consisting of poly (C1–C12 alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly(alpha methylstyrene), copoly(styrene-methyl methacrylate), copoly(styrene-acrylonitrile) and polyvinylbutyral.

3. The photochromic article of claim 1 wherein the optical organic resin is selected from the group consisting of polymers derived from monomers selected from the group consisting of polyol(allyl carbonate)monomers, polyfunctional acrylate monomers, polyfunctional methacrylate monomers, di-isopropenyl benzene monomers, ethoxylated bisphenol A dimethacrylate monomers, ethylene glycol bismethacrylate monomers, poly(ethylene glycol) bismethacrylate monomers, ethoxylated phenol methacrylate monomers, alkoxylated polyhydric alcohol acrylate monomers and diallylidene pentaerythritol monomers.

4. The photochromic article of claim 1 wherein the optical organic resin is a solid transparent polymer selected from the group consisting of poly(methyl methacrylate), poly (ethylene glycol bismethacrylate), poly(ethoxylated bisphenol A dimethacrylate), thermoplastic polycarbonate, poly (vinyl acetate), polyvinylbutyral, polyurethane, diethylene glycol dimethacrylate polymer, ethoxylated phenol methacrylate polymer, di-isopropanol benzene polymer and ethoxylated trimethylol propane triacrylate polymer.

5. The photochromic article of claim 1 wherein the photochromic naphthopyran is present in an amount of from 0.05 to 1.0 milligram per square centimeter of a single major surface of said photochromic article.

6. The photochromic article of claim 1 wherein the article is a lens.

7. The photochromic article of claim 2 wherein the article is a lens.

8. The photochromic article of claim 3 wherein the article is a lens.

9. The photochromic article of claim 4 wherein the article is a lens.

10. A photochromic article comprising at least one naphthopyran in a polymeric composition, said at least one naphthopyran comprising a 3,3-[substituted]-naphtho[2,1-b] pyran or a 2,2-[substituted]-naphtho[1,2-b]pyran wherein:

c) one 3-position substituent on a 3,3-[substituted]-naphtho[2,1-b]pyran comprises a phenyl group or d) one 2-position on a 2,2-[substituted]-naphtho[1,2-b]pyran comprises a phenyl group and another of the 3-positions on the 3,3-[substituted]-naphtho[2,1-b]pyran or another of the 2-positions on the 2,2-[substituted]-naphtho[1,2-b]pyran comprises a substituted phenyl group having a substituent on the substituted phenyl group selected from the group consisting of an anthranilyl, azepinyl, benzoxazolyl, diazepinyl, diazolyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrrol, isoquinolyl, isothiazolyl, morpholino, morpholinyl, oxadiazolyl, oxathiazolyl, oxathiazyl, oxathiolyl, oxatriazolyl, oxazolyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyriinidinyl, pyrimidyl, pyridenyl, pyrrolidinyl, pyrrolinyl, pyrroyl, quinolizinyl, quinocyclidinyl, quinolyl, thiazolyl, triazolyl and triazyl groups.

11. The photochromic article of claim 10 wherein the polymer of said polymeric composition is selected from the group consisting of poly(C1–C12 alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly(alpha methylstyrene), copoly(styrene-methyl methacrylate), copoly(styrene-acrylonitrile), and polyvinylbutyral.

12. The photochromic article of claim 10 wherein the polymer of said polymeric composition is selected from the group consisting of polymers derived from monomers selected from the group consisting of polyol(allyl carbonate) monomers, polyfunctional acrylate monomers, polyfunctional methacrylate monomers, di-isopropenyl benzene monomers, ethoxylated bisphenol A dimethacrylate monomers, ethylene glycol bismethacrylate monomers, poly(ethylene glycol)bismethacrylate monomers, ethoxylated phenol methacrylate monomers, alkoxylated polyhydric alcohol acrylate monomers and diallylidene pentaerythritol monomers.

13. The photochromic article of claim 10 wherein the naphthopyran is present in an amount of from 0.05 to 1.0 milligram per square centimeter of a single major surface of said photochromic article.

14. The photochromic article of claim 10 wherein the article is a lens.

\* \* \* \* \*